Sept. 29, 1953   A. L. SIMISON   2,653,473
APPARATUS FOR DETERMINING PROPERTIES OF RESINS
Filed July 29, 1950
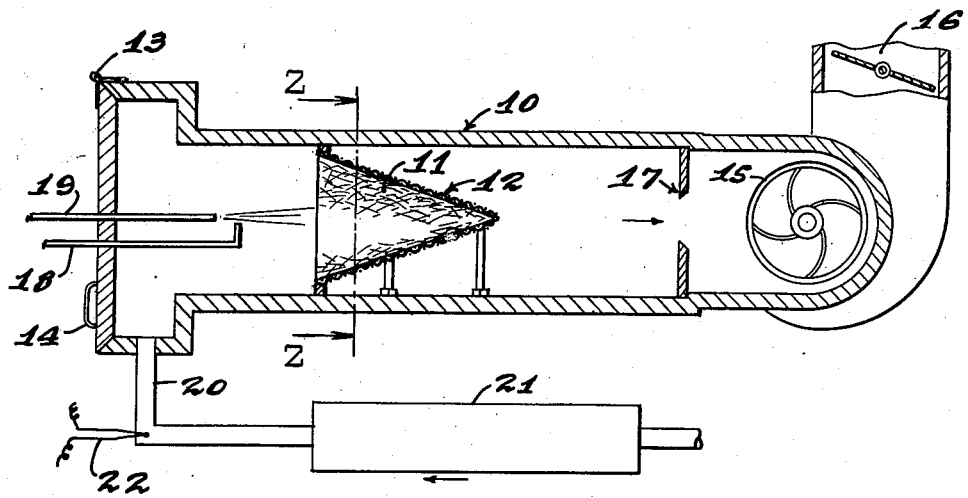
FIG-1-
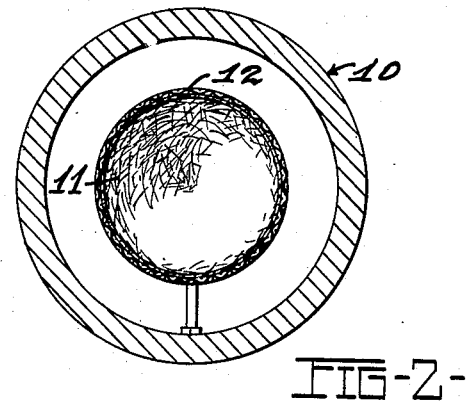
FIG-2-
INVENTOR:
ALLEN L. SIMISON.
BY
Staehli & Overman
ATTYS.

Patented Sept. 29, 1953

2,653,473

UNITED STATES PATENT OFFICE 2,653,473

APPARATUS FOR DETERMINING PROPERTIES OF RESINS

Allen L. Simison, Ottawa Hills, Toledo, Ohio, assignor to Owens-Corning Fiberglas Corporation, a corporation of Delaware Application July 29, 1950, Serial No. 176,601

3 Claims. (Cl. 73—150)

This invention relates to apparatus for determining the properties of resins, for instance, resinous binders for fibrous materials, and particularly the efficiency of application of a resinous binder to mineral wool.

Since many fibers, particularly mineral fibers, such as those made of glass, have round, smooth, non-cohering surfaces, a mass of such fibres lacks self integrity and unification. Accordingly it is customary to apply a binder such as a thermosetting polymer to the fibrous mass and effect an artificial bond at the fiber junctures, thereby to impart mass integrity. As used herein, the term "thermosetting polymer" denotes a substance that is capable of conversion as by heat into an infusible resin.

For instance, one practice is to spray an aqueous solution of a thermosetting polymer, such as phenol formaldehyde in the "A" stage of polymerization, onto a mass of glass fibers arranged in any sort of pattern, usually in a helter-skelter jackstraw relation. Subsequently, the fibrous mass is heated to evaporate the water and advance the binder to the final or "C" stage and, in this manner, effect the bonding action. In such an integral form, the fibrous product has many useful applications, for example, as thermal insulation.

Because of the large part it plays, the binder must be supplied for industrial purposes in appreciable quantities. It is difficult to prepare such large lots and at the same time accurately control all portions with respect to the final specifications required. For instance, it frequently occurs that some of the binder is "green" or undercured even for the "A" stage of polymerization. When such a preparation is used as a binder, the undercured portions escape as volatiles resulting in poor binder efficiency. Also, since the times and conditions for binder application and cure are constant in a continuous commercial process, failure of the binder to perform its assigned part to the degree and in the time contemplated results in poorly bonded products.

Further, when a thermosetting polymer is used as a fiber binder, it is spread out as a fine film between the fiber junctures. Consequently, its surface area is increased many thousandfold, especially as compared to when it is molded as a single, integral article. In such a form it is therefore considerably more susceptible to the various agencies of attack such as the surface alkali of the glass, the polymerization catalyst remaining in the thermosetting polymer, and the like.

Experience has shown that in certain cases, the color of a binder after polymerization to the final stage foretells its probable future dependability and resistance to such attack. For example, where phenol formaldehyde, a very commonly used binder, is red to black in color after final polymerization, it can be expected subsequently to become soft and appreciably lose its ability to bind the fibers one to another. But if it is orange to brown, such latent defect is not present and the binder can be expected to perform its intended function for an acceptable length of time.

Before the present invention, it was necessary to take factory time and factory apparatus to test a binder solution to determine if it met these and other specifications. If it so happened that the binder was defective in one or more properties, not only was this valuable time lost from production, but there was an appreciable waste of the fibers and of other materials used in the manufacturing steps, of labor, and the like.

The principal object of the present invention is to provide improved means for quickly determining the properties of a binder for fibrous matter.

A leading object is to provide means for the quick and accurate determination of binder efficiency.

Another object is to provide means for determining binder properties for fibrous material by tests conducted substantially on the binder alone.

More specific objects and advantages are apparent from the following description, which merely discloses and illustrates the invention and is not intended to limit the claims.

The invention relates to apparatus for polymerizing a thermosetting polymer and collecting those polymers that are at least of a predetermined molecular weight.

Figure 1 is a semi-schematic vertical longitudinal cross-section of one form of the invention; and Figure 2 is a transverse section of the form of Figure 1 taken along the line 2—2.

Referring to these drawings, a chamber or compartment 10 is provided with a porous fibrous restraining wall 11. The wall usually has a conical or bag-like shape and is supported in an open mesh metal screen or adapter 12 having a similar shape. The assembly is pointed with its open end toward the entrance of the chamber. The particular configuration or arrangement of the fibrous wall is not critical, but it is preferable to use the same type of fibers and in the same space relation for a given type of binder under test as will be met in practice in order to simulate actual conditions of use as much as possible.

Frequently an unbonded fibrous mass is used for the wall if it is desired to examine or test the resulting bond made by the binder solution under test. In some cases where this practice is followed, the fibers used are continuous and woven into a cloth in order to distribute the fibers evenly over the surface of the supporting screen and provide mass integrity to the fibrous wall. However, it is not necessary to use an unbonded fibrous wall if a bonded one is first preheated to remove volatiles remaining in the binder or on the wall from a previous test and thereby prevent erroneous results for subsequent tests.

One end of the chamber is hinged as at 13 and provided with a handle 14 to provide means of access to the interior. In this way, the fibrous cone or bag may be easily removed or inserted, for example, when determining its tare or final weight or for visual inspection. The chamber is exhausted by a fan 15 which may be of the centrifugal type discharging through a duct 16. An orifice plate 17 may be used in conjunction with conventional manometers (not shown) to measure the rate of air flow through the chamber.

In practice, while the fan is being driven by a motor, a known amount of a solution of an uncured binder of known percentage composition is flowed or pumped at a uniform rate into the chamber 10 through the inlet tube 18. The discharge end of the latter is pointed into a blast of air supplied under constant pressure from the tube 19 so that the binder solution is atomized into many fine particles. At the same time, the exhaust fan 15 uniformly draws into the chamber through the inlet tube 20 a quantity of air preheated in the oven 21. The oven may be heated by small radiant gas-fired burners or electric coils. Its temperature may be manually regulated with reference to the temperature of the air as it enters the chamber as indicated by the thermocouple 22.

The combination of heat and increased surface area quickly polymerize the binder. Those polymers thereby created or already present in the binder solution, which under the temperature and time of exposure of the test are still fairly volatile due to a low molecular weight, pass through the porous wall 11 and are exhausted to the atmosphere through the duct 16. The remaining polymers of a higher molecular weight are entrapped on the wall 11. This residue represents that portion of the binder which actually would be utilized in a bonding action.

Consequently, knowing how much binder was fed to the chamber and by determining the weight of the polymers deposited on the wall 11, the efficiency of the binder under the conditions of test may be calculated. Its color may also at this time be noted. Various other tests may be made if desired. For example, the strength of the bond, its brittleness, the flexural strength of the bonded mass, and the like may be determined by inspection or conventional tests.

It should be understood that the operating conditions such as temperature, rates of flow of binder solution, air, and the like, although uniform for a given test, are not an essential part of the invention and may be widely varied to meet various demands, depending on the type of binder used, the conditions of its application, and similar factors. However, as an example and with no intent to limit the invention, when the fibers are glass and the binder solution is an aqueous solution of phenol formaldehyde in the "A" stage of polymerization, the following operating procedure has been found to be satisfactory.

A hollow cone of glass fibers was heat cleaned for two hours at 900° F., weighed to the nearest 0.01 gram, and then placed in a supporting screen or adapter positioned in a reaction chamber of the present invention. With the chamber door closed, the exhaust fan was started after which compressed air was admitted through the atomizing tube and adjusted to 30 p. s. i. g.

The total amount of air flowing through the chamber was regulated by adjusting a damper in the discharge duct until the readings before and after the orifice plate were approximately 0.07 to 0.10 inch of mercury and 4.3 to 4.5 inches of mercury, respectively.

At this point the preheater was started and the unit brought to operating temperatures. For this run these conditions were a temperature of 482° F. plus or minus 3° F. as indicated by a thermocouple positioned as shown in the drawing. This corresponded to a temperature of 330° F. to 380° F. at the area occupied by the glass fiber cone.

Next 10 cubic centimeters of an aqueous solution of phenol formaldehyde in the "A" stage of polymerization, adjusted to 50% solids, were introduced into the chamber over a period of five minutes through the tubular inlet reserved for the binder solution. Subsequently an additional five minute period was allowed for the polymerization to take place after which the operation was halted. The cone was then removed, allowed to come to room temperature, and weighed to the nearest 0.01 gram.

At this time the cone was also visually inspected. The formula then used for calculating the efficiency of the binder solution under test was as follows:

$$\text{Percent } E = \frac{W}{G \times V \times S} \times 100$$

wherein E is the efficiency; W the increase in weight of the cone; G the specific gravity of the binder solution; V the volume of the solution used; and S the percent solids in the solution.

By the present invention, the efficiency of a binder solution may be quickly and accurately determined. The color of the binder in its final stage of polymerization and other properties of the bonded mass may in a like manner be easily obtained. Further, there is no interruption with factory procedure so that factory time, apparatus and quality products need not be sacrificed to obtain these results.

Various modifications and changes may be made in the invention within the spirit of the disclosure and the appended claims.

I claim:

1. Apparatus for determining the efficiency of a thermosetting binder comprising a tubular chamber substantially enclosed and having an access door at one end, separate inlets into said chamber at the same end for a thermosetting binder solution in the "A" stage of polymerization, for compressed air, and for heated air, wherein the discharge end of the binder inlet is substantially at right angles and in close proximity to the discharge end of the compressed air inlet, a preheater stationed in series with the heated air inlet, an air exhausting means positioned at the other end of said chamber, an exhaust duct at the same end, a glass fiber cartridge having a conical shape disposed within said chamber with its open end facing the discharge end of said compressed air inlet, and an orifice plate disposed within said chamber.

2. Apparatus for quickly and accurately determining binder properties comprising a chamber, a conical fibrous glass member adapted for easy insertion and removal from said chamber, fan means for exhausting air from said chamber, an air inlet port for said chamber, said air inlet port having an air preheater connected therewith, said fan means and said air inlet port being disposed on opposite sides of said conical fibrous glass member in said chamber, and means for introducing a solution of binder into said chamber, said latter means being disposed on that side of said conical fibrous glass member which is adjacent said air inlet port.

3. Apparatus for determining binder properties comprising a chamber, a conical screen member supported within said chamber, a removable, conical fibrous glass member adapted for nesting within said screen member, fan means for exhausting air from said chamber, an air inlet port for said chamber, said air inlet port having a heating means connected therewith, said fan means being adapted for pulling heated air through said conical fibrous glass member, and means for introducing binder into said chamber adjacent said air inlet port.

ALLEN L. SIMISON.

References Cited in the file of this patent

UNITED STATES PATENTS

| Number | Name | Date |
|---|---|---|
| 1,185,821 | Pittman et al. | June 6, 1916 |
| 1,834,687 | Davis | Dec. 1, 1931 |
| 1,884,486 | Zavertnik, Jr. | Oct. 25, 1932 |
| 1,938,876 | Yakata | Dec. 12, 1933 |
| 1,961,921 | Bowen | June 5, 1934 |
| 2,072,872 | Finkelstein | Mar. 9, 1937 |
| 2,403,740 | Muench | July 9, 1946 |
| 2,550,465 | Gorski | Apr. 24, 1951 |

FOREIGN PATENTS

| Number | Country | Date |
|---|---|---|
| 406,512 | Great Britain | Mar. 7, 1934 |